they thereto, no undue strain is placed on the diaphragm 119.

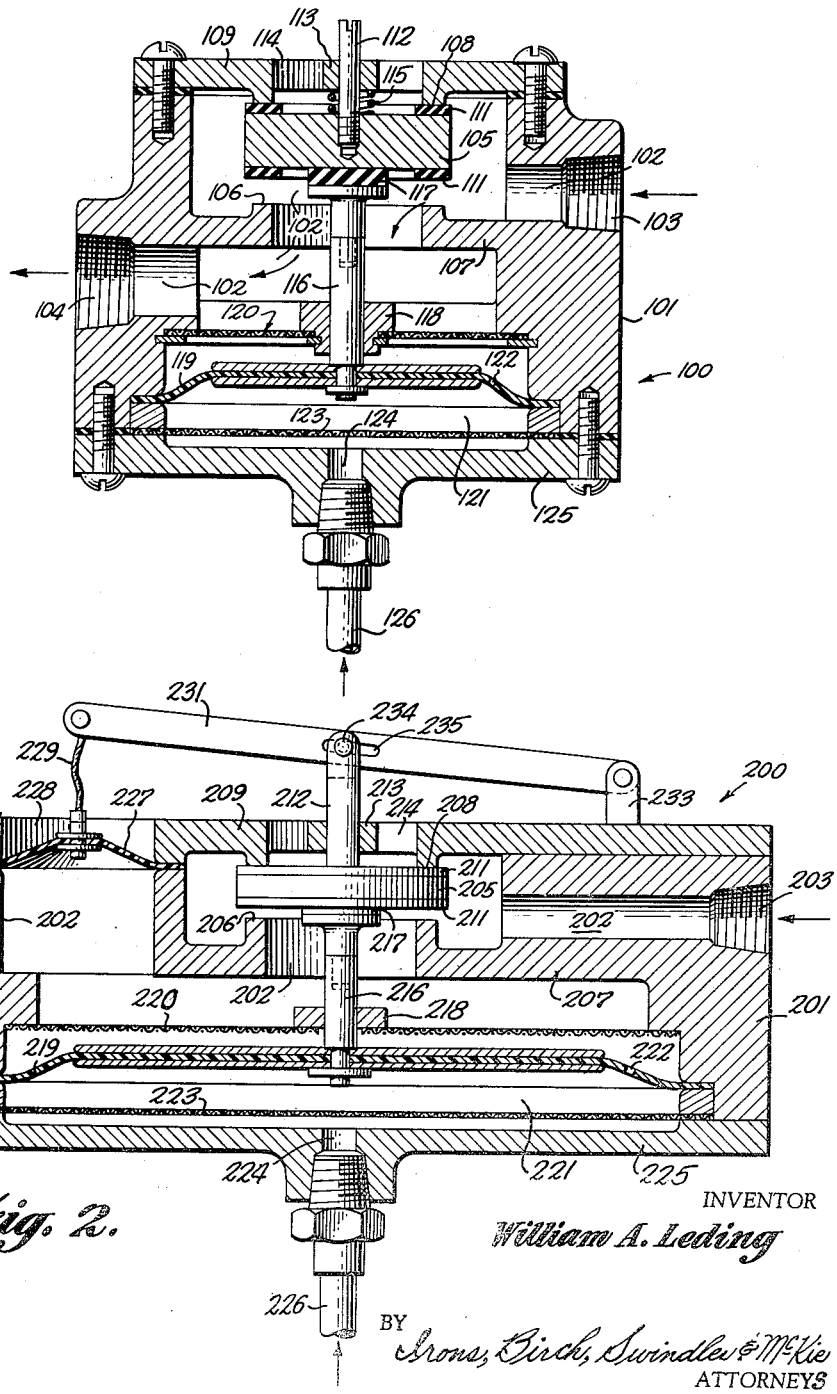

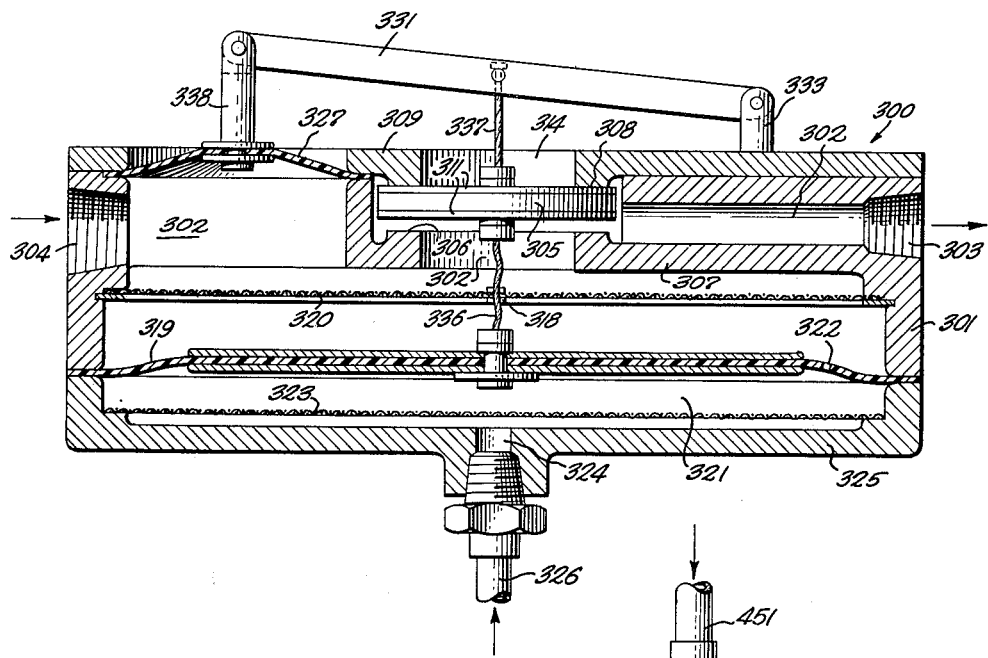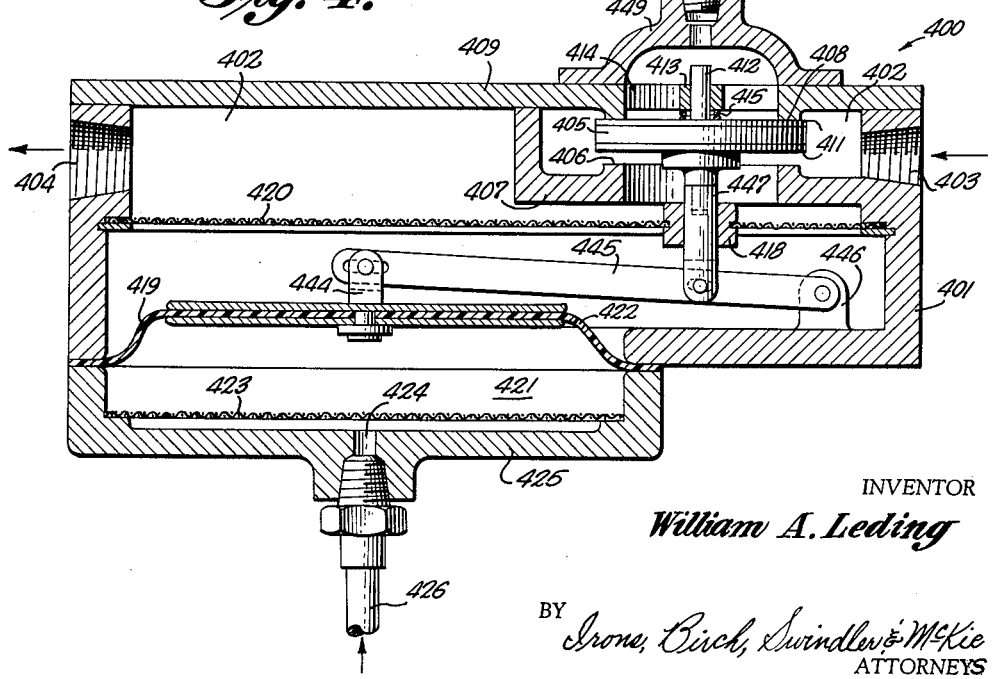

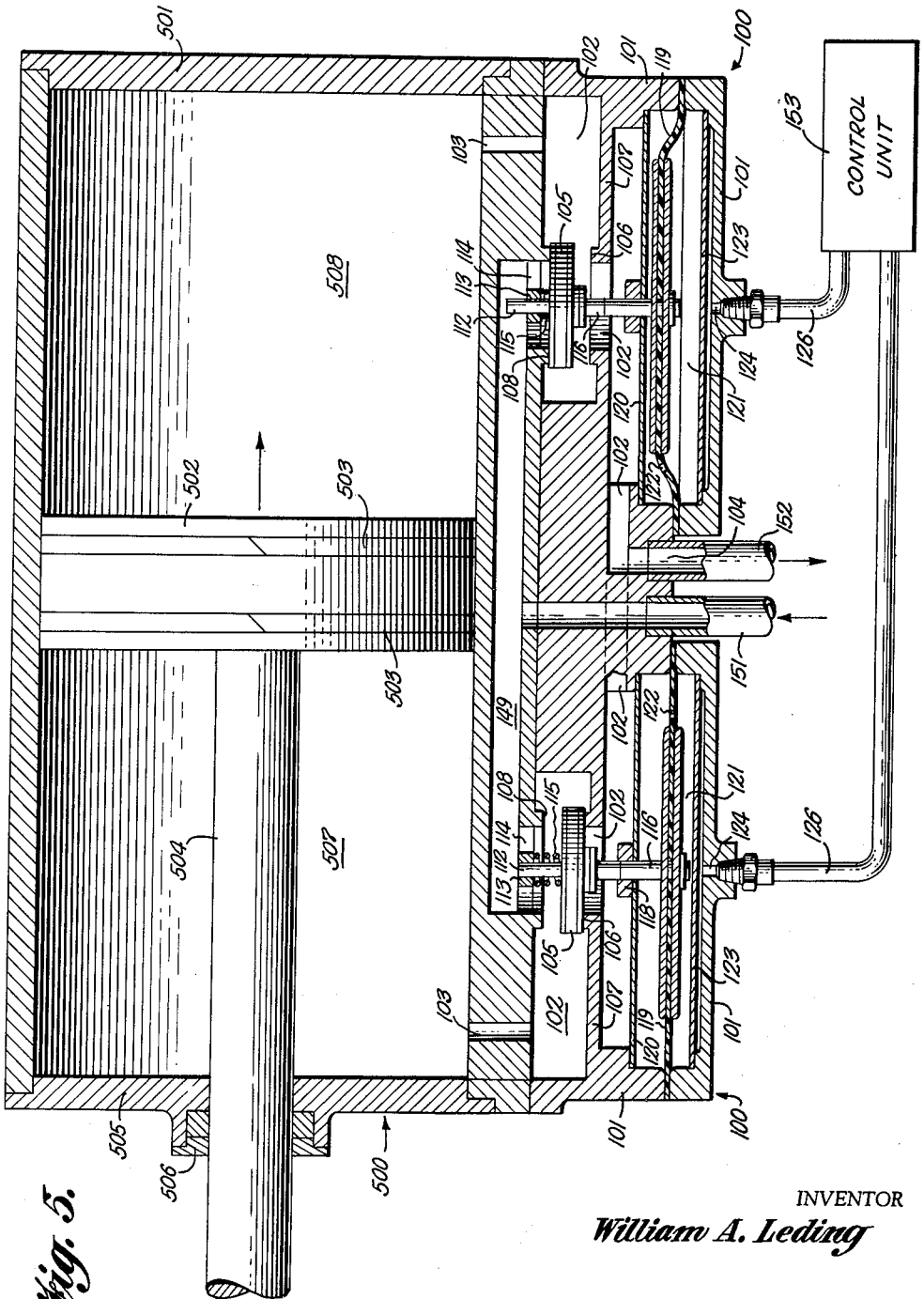

United States Patent Office 3,162,212
Patented Dec. 22, 1964

3,162,212
FLUID FLOW CONTROL DEVICE
William A. Leding, 507 N. 14th St., Fort Smith, Ark.
Filed Sept. 11, 1961, Ser. No. 137,240
8 Claims. (Cl. 137—625.6)

This invention relates to fluid flow control and more particularly to valves controlled by fluid pressure responsive mechanisms.

Various devices heretofore have been developed for controlling the operation of a valve by a mechanism which is responsive to fluid pressure. Many of such devices have been characterized by various disadvantages such as slow operation, high cost, complexity of construction and the like.

To overcome the disadvantages of the prior art it is an object of the present invention to provide an improved fluid flow control device embodying a valve controlled by a fluid pressure responsive mechanism which device is efficient and economical.

It is a further object of the present invention to provide an improved fluid pressure control device for subjecting a pair of chambers to alternating unbalanced fluid pressure.

In general the apparatus of the invention comprises a fluid flow control device comprising a valve body providing a fluid passageway through said body, a valve mounted in said valve body to control flow through said passageway, said valve being movable between open and closed positions, means to bias said valve toward one of said positions, fluid pressure responsive wall means connected to said valve to move said valve to the other of said positions when the fluid pressure on opposite sides of said wall means is unbalanced to overcome said bias, said wall means being exposed on one side to a control chamber and on the other side to a first portion of said passageway on one side of said valve, said wall means having a restricted conduit connecting its opposite sides, means connected on said one side of said valve to said first portion of said passageway to produce a first fluid pressure in said first portion, and control means shiftable between a first condition to connect said control chamber to a source of second fluid pressure different from said first pressure to unbalance said wall means to overcome said bias and a second condition to close said chamber so that said wall means will be biased to said one position.

The invention also envisions a fluid pressure control device for subjecting a pair of chambers to alternating unbalanced fluid pressure which comprises a pair of valve bodies providing fluid passageways through said bodies, one end of each of said passageways communicating with different ones of said chambers said one end of each of said passageways also communicating with a source of first fluid pressure, the other end of each of said passageways being connected to a source of second fluid pressure, a valve mounted across each of said passageways to control flow therethrough, each of said valves being movable between positions opening and closing its associated passageway, said valve being mounted to block and open the communication between said one end and said source of first fluid pressure when it opens and closes said passageway respectively, said first and second fluid pressures acting on opposite sides of said valve normally biasing said valve toward one of said positions, fluid pressure responsive wall means in each of said valve bodies connected to each of said valves to move said valves to the other of said positions when the fluid pressure on opposite sides of said wall means is unbalanced to overcome said bias, each of said wall means being exposed on one side to a control chamber and on the other side to said second fluid pressure, each of said wall means having a restricted conduit connecting its opposite sides, and control means connected to said control chambers and being shiftable to alternately and oppositely subject each of said control chambers to first and second conditions, each chamber in said first condition being connected to a source of fluid pressure different from said second fluid pressure to unbalance its wall means to overcome said bias and in said second condition to permit its valve to be biased to said one position.

The invention having been generally described various specific embodiments thereof will now be set forth in detail with reference to the accompanying drawings in which:

FIGURES 1, 2, 3 and 4 are sectional views showing four different embodiments of the apparatus of the invention; and FIGURE 5 is a sectional view of a reciprocating fluid pressure engine controlled by a pair of fluid flow control devices according to the invention.

Four different embodiments of a flow control device according to the invention are shown in FIGURES 1 through 4 of the drawings and are designated as 100, 200, 300 and 400 respectively. To simplify the description and eliminate duplication corresponding elements in the four embodiments are identified by reference numerals having the same last two digits. The functions of the corresponding elements are essentially identical.

The control device 100 shown in FIGURE 1 includes a valve body 101 which has a passageway 102 extending completely through the valve body. The passageway 102 terminates at one end at an opening 103 extending through a wall of the valve body 101 and at the other end at an opening 104 extending through another wall of the valve body 101. Mounted in the valve body to control the flow through the passageway 102 is a valve 105 which is cooperable with a valve seat 106 extending across the passageway 102 and defined by a wall 107 integral with the valve body 101 and extending transversely across the passageway 102. The opposite end of the valve 105 cooperates with a seat 108 provided on a cover plate 109 which forms a portion of the valve body 101. To insure an adequate seal between the valve 105 and the seats 106 and 108 an annular rubber ring 111 is bonded to each face of the valve 105 to seal against the seats 106 and 108. A valve steam 112 is threadedly connected to the valve 105 and extends through an opening in a spider 113 affixed in an opening 114 in the cover plate 109. When the valve 105 is seated against the valve seat 106 the opening 114 vents to atmosphere the portion of the chamber 102 which is on the same side of the valve seat 106 as the opening 103. Mounted between the spider 113 and the valve 105 is a compression spring 115 which normally biases the valve 105 against the seat 106 to close the passageway 102. It will be understood that various types and locations of springs or other biasing means, including magnetic means, could be used instead of the spring 115.

A second valve stem 116 is secured to the face of the valve 105 opposite the valve stem 112. A cushion is provided between the stem 116 and the valve 105 by a rubber member 117 securely bonded between the stem 116 and the valve 105. The stem 116 extends through and is guided by a spider 118 which is affixed to the valve body 101. The end of the stem 116 opposite the valve 105 is securely fixed to a resilient diaphragm 119 which is secured around its outer periphery to the valve body 101 to form a fluid pressure responsive wall means to control the operation of the valve 105. The valve stem 116 comprises two telescopically engaged parts. Thus downward movement of the diaphragm 119 imparts no pulling action on the valve 105 whereas upward movement of the diaphragm applies a lifting force to the valve 105 through the telescoping connection in the valve stem 116. Either the telescoping connection or the resilient cushion 117 may be eliminated if desired.

When the fluid pressure on the opposite sides of the diaphragm 119 is balanced the spring 115 causes the valve 105 to be seated against the seat 106. When the pressure on the lower side of the diaphragm 119, as viewed in FIGURE 1, is sufficiently greater than the pressure on the upper side of the diaphragm 119 to overcome the bias of the spring 115 the valve is forced against the seat 108. The diaphragm 119 is exposed on its upper side to the pressure in the portion of the passageway 102 which extends between the opening 104 and the valve seat 106. The opposite side of the diaphragm 119 is exposed to the pressure in a control chamber 121 in the lower portion of the valve body 101 as viewed in FIGURE 1. The diaphragm 119 has a restricted conduit 122 extending through the diaphragm to connect its opposite sides. Mounted across the valve body 101 on opposite sides of the diaphragm 119 are a pair of filters 120 and 123 which may be a finely woven fabric or other suitable filter means. If desired, the upper filter 120 may be sealingly fixed to the valve stem 116 and flex with the movement of the stem.

Moreover, the telescoping connection may be placed below the upper filter thus connected to the stem so that such connection will always be between the two filters.

The chamber 121 has an outlet 124 which extends through the bottom cover plate 125 of the valve body 101. The cover plates 109 and 125 are bolted to the main portion of the valve body 101 to form fluid tight connections. It will be understood that other means such as welding may be employed to secure the cover plates. Connected to the outlet 124 is a conduit 126 in which is mounted a valve (not shown) which may close the conduit 126 or vent it to atmosphere.

A vacuum pump (not shown) is connected to the outlet 104. The opening 103 is connected to a device to which it is desired to apply suction from the vacuum pump. For example, the outlet 103 may be connected to a tank filled with gas which it is desired to periodically draw out through the passageway 102 and the vacuum pump attached to the outlet 104. Preferably the opening 104 is larger than the opening 103 to insure that sub-atmospheric pressure is maintained in the passageway 102. Alternatively, the openings 103 and 104 may be the same size with a restricted opening between the valve 105 and the valve seat 106.

In operation of the device of FIGURE 1, the valve in the conduit 126 may be opened to vent the chamber 121 to atmosphere. When suction is applied to the opening 104 by the vacuum pump a pressure unbalance on the opposite sides of the diaphragm 119 is created, one side being exposed to atmospheric pressure in the chamber 121 and the other side being exposed to sub-atmospheric pressure in the lower portion of the passageway 102. The size of the conduit 122 is such that gas may not escape therethrough sufficiently fast to offset the unbalanced fluid pressure. Consequently, the diaphragm 119 is forced upwardly to seat the valve 105 against the seat 108 thereby opening the passageway 102 to connect the suction pump connected to the outlet 104 with the tank or the like connected to the outlet 103.

When the valve in the conduit 126 is shifted to block the conduit 126 and close the chamber 121, the pressure in the chamber 121 is quickly reduced by the flow of gas through the conduit 122 to equalize the pressure on opposite sides of the diaphragm. The spring 115 then biases the value 105 against the seat 106 to close the passageway 102.

A modified form of the invention is shown in FIGURE 2 and is referred to by the reference numeral 200. This embodiment comprises a valve body 201 having a passageway 202 extending therethrough between openings 203 and 204. As in the case of the control device 100 a vacuum or suction pump is connected to the opening 204 and the opening 203 is connected to any means to which the suction is to be applied. A valve 205 alternatively cooperates with a seat 206 in a wall 207 extending across the valve body and a seat 208 defined by a cover plate 209 of the valve body 201. Sealing rings 211 are bonded to the opposing faces of the valve 205. Stems 212 and 216 are connected to the opposite faces of the valve 205. Stem 212 extends through a spider 213 in an opening 214 through the cover plate 209. A rubber cushion 217 is situated between the stem 216 and the valve 205. The stem 216 comprises two telescoping sections and extends through a spider 218.

To the lower end of the stem 216 is rigidly secured a diaphragm 219 through which a restricted conduit 222 extends. The diaphragm 219 is exposed on one side to the pressure in the lower portion of the passageway 202 and on the other side to a pressure in a control chamber 221. Secured across the valve body 201 are filters 220 and 223 on opposite sides of the diaphragm 219. An opening 224 is provided in a cover plate 225 which connects the chamber 221 with a conduit 226 in which a valve is mounted similar to the valve in the conduit 126 previously described.

The elements of the control device 200 thus far described are identical in their operation to the correspondingly numbered elements of the control device 100 shown in FIGURE 1. The control device 200 essentially differs from the control device 100 only with respect to the biasing means for the valve 205 to force the valve 205 normally against the seat 206. Such biasing means comprises a resilient diaphragm 227 which is mounted by a fluid tight connection across an opening 228 in the cover plate 209. The diaphragm 227 is exposed on one side to atmosphere and on the other side to the pressure in the lower portion of the passageway 202 as viewed in FIGURE 2, i.e. the portion below the valve seat 206. The diaphragm 227 is connected by a flexible cable 229 to a lever 231 which is pivotally connected to a stud 233 mounted on the cover plate 209. Intermediate the connections to the stud 233 and the cable 229 the lever 231 is connected to the valve stem 212 which is bifurcated to embrace the lever 231 and is connected thereto by a pin 234 which extends through a slot 235 in the lever 231.

When suction is applied through the outlet 204, an unbalanced pressure on opposite sides of the diaphragm 227 is created because the lower side of the diaphragm 227 is exposed to the pressure in the lower part of the passageway 202 and the upper side of the diaphragm is exposed to atmosphere. Accordingly, the diaphragm 227 tends to move downwardly to impart a downward bias to the stem 212 through the cable 229 and the lever 231. When the pressure on the opposite sides of the diaphragm 219 is equalized the bias imposed by the diaphragm 227 causes the valve 205 to be forced against the seat 206. On the other hand when the chamber 221 is vented so that an upward force is applied to the diaphragm 219, the force exerted by the diaphragm 219 overcomes the bias of the diaphragm 227 which is substantially smaller in area than the diaphragm 219. Accordingly, the valve 205 is then forced against the seat 208 to open the passageway 202.

A further modified form of the invention is disclosed in FIGURE 3 and is identified by the reference numeral 300. The control device 300 is very similar in its construction and operation to the control device 200 except that the former is designed to have a source of positive pressure such as a pressure pump connected to the opening 304 and a device to which the pressure is to be applied is attached to the opening 303. Thus, the direction of flow through the passage 302 is opposite from the direction of flow through the passage 202. In the device 300 a flexible connection is provided between the diaphragm 319 and the valve 305 by the cable 336 secured at its ends to the valve and diaphragm. A similar flexible cable 337 is rigidly secured between the valve 305 and the lever 331. It will understood that rigid elements may be substituted for the flexible cables 336 and 337 if desired. A rigid link 338 is fixed at one end to the diaphragm 327 and at its other end is pivotally connected to the lever 331.

The operation of the control device 300 will now be described. When pressure is applied by the pump connected to the opening 304, and the valve mounted in the conduit 326 is open, the diaphragm 319 is exposed to superatmospheric pressure on its upper side, as viewed in FIGURE 3, and to atmospheric pressure on its lower side. Since the conduit 322 restricts the flow of gas through the diaphragm 319, the unbalanced pressure moves the diaphragm 319 downwardly, thereby pulling the valve 305 against the seat 306 to close the passageway 302. When the valve in the conduit 326 is shifted to close the chamber 321, the pressure in the chamber 321 is quickly raised by escape of gas downwardly through the conduit 322 and the pressure on opposite sides of the diaphragm 319 becomes equalized. Accordingly, the superatmospheric pressure in the passageway 302 forces the diaphragm 327 upwardly and through the lever 331 and the cable 337 the valve 305 is lifted against the seat 303 and away from the seat 306 to open the passageway 302 thereby permitting flow through the valve body 301.

Shown in FIGURE 4 is a further modification of the invention which is identified by the reference numeral 400. The control device 400 is essentially like the control device 100 in its structure and operation except as described hereinafter.

The diaphragm 419 of the control device 400 operates the valve 405 through a force multiplying linkage. Specifically, the diaphragm 419 has attached thereto a stud 444 which is pivotally connected to one end of a lever 445 through a pin and slot connection. The other end of the lever 445 is pivotally connected to a stud 446 which is mounted on the housing 401. The lever 445 is pivotally connected intermediate its ends to the valve stem 447 which is connected to the bottom of the valve 405 as viewed in FIGURE 4.

The control device 400 causes alternating suction and pressure to be applied through the opening 403. To this end a manifold 449 is connected to the cover plate 469 by a fluid tight connection over the opening 414. A conduit 451 leads into the manifold 449. Connected to the conduit 451 is a pump (not shown) which conducts gas under superatmospheric pressure to the manifold.

When suction is applied through the opening 404 and pressure is applied through the opening 414, shifting of the valve in the conduit 426 alternately applies suction or pressure to the opening 403. When the valve in the conduit 426 is closed, thereby closing the chamber 421, the fluid pressure on opposite sides of the diaphragm 419 is equalized. Thus the combined bias of the pressure in the manifold 449 and the compression spring 415 forces the valve 405 downwardly against the seat 406. It will be understood that the spring 415 may be eliminated and the bias supplied solely by the pressure within the manifold 449. With the conduit 402 closed, at the valve 405, conduit 451 is connected with the outlet 403 and pressure is applied through such outlet.

When the valve in conduit 426 is opened, the resulting differential fluid pressure on opposite sides of the diaphragm 419 causes it to rise thereby applying an upward force through the force multiplying linkage to the valve 405. Such force is sufficient to overcome the bias imposed by the pressure in the manifold 449 and the spring 415. Accordingly, the valve is forced against the seat 403 thereby opening the passage 402 and connecting the source of suction, which is applied through the opening 404, to the opening 403. If desired, any automatically operated mechanism may be used to periodically open and close the valve in the conduit 426 in a regular cycle. Thus, alternate suction and pressure will be correspondingly applied to the opening 403 to which any suitable device may be connected. For example, a cylinder in which a piston is mounted may be connected to the opening 403 and the alternating suction and pressure employed to reciprocate the piston.

Illustrated in FIGURE 5 is a reciprocating fluid pressure operated engine 500, the operation of which is controlled by a pair of control devices which correspond to the device 100 shown in FIGURE 1.

The motor 500 includes a cylinder 501 in which a piston 502 is mounted for reciprocation. The piston is provided with the usual split rings 503 to perfect a seal against the cylinder wall. A piston rod 504 is connected to the piston and extends axially through one end wall 505 of the cylinder. A seal around the piston rod 504 is provided by a conventional stuffing box 506. The outer end of the piston rod 504 may be connected to any suitable mechanism to be reciprocated.

The piston 502 divides the cylinder 501 into a pair of chambers 507 and 508. The chamber 507 communicates with the opening 103 of one of the control devices 100 and the chamber 508 communicates with the opening 103 of the other of the control devices 100.

The control devices 100 have a common outlet 104 to which a conduit 152 is connected. The conduit 152 leads to a suction pump not shown. The conduit 151 is connected to a source of positive superatmospheric pressure such as a pressure pump (not shown) and leads into the manifold 149 which is connected to the opening 114 of each of the control devices.

The conduits 126 leading from the control chambers 121 of the two control devices 100 are connected to a control unit 153 which comprises valves for opening and closing each of the conduits 126 and any appropriate automatic device for alternately and oppositely opening the valves in each of the conduits 126. For example a pendulum may be attached to the valves in such a manner that it opens the valve in one conduit 126 as it closes the valve in the other conduit 126 and then swings in an opposite direction to reverse the condition of each of the two valves.

In the condition of the engine 500 as shown in FIGURE 5, the valve conduit 126 of the left hand control device 100 is closed and the valve conduit 126 of the right hand control device 100 is open. Accordingly, the fluid pressure on opposite sides of the left hand diaphragm 119 is balanced and the valve 105 of that device is biased against the seat 106 to connect the chamber 507 with the pressure line 151. On the other hand, the fluid pressure on the opposite sides of the right hand diaphragm 119 is unbalanced to force the valve 105 in that unit upwardly against the seat 103 thereby opening the passage 102 and connecting the chamber 508 with the suction line 152. Accordingly, a greater pressure exists in the chamber 507 than in the chamber 508 and the piston moves to the right. The control unit is so timed that when the piston 502 reaches an extreme right hand position the condition of the valves in the two conduits 126 are reversed. If desired switches may be employed to control the operation of such valves, which switches are actuated by the piston 502 near the ends of its stroke. Upon the reversal of the valves in the conduits 126, the chamber 508 becomes connected with the pressure line 151 and the chamber 507 becomes connected with the suction line 152 thereby causing the piston 502 to move to the left.

The springs 115 shown in FIGURE 5 may be eliminated and the valves 105 will then be biased downwardly solely by the fluid pressure provided through the conduit 151. Moreover, control unit 153 may cause the conduits 126 to be subjected to oppositely alternating suction and pressure to control the operation of the valves 105.

Several embodiments of the invention have been illustrated and described. It will be understood that various other modifications and alternatives will occur to persons skilled in the art without departing from the scope of the invention as defined by the appended claims.

I claim:

1. A fluid flow control device comprising a valve body providing a fluid passageway through said body, a partition dividing said passageway into first and second portions, said partition having an opening to provide fluid communication between said portions, a valve mounted in said valve body to control flow through said opening, said valve being movable between open and closed positions, means to bias said valve toward one of said positions, fluid pressure responsive wall means spaced from said opening and extending across said first portion, said valve being located in said second portion on the opposite side of said opening from said wall means, said wall means being connected to said valve to move said valve to the other of said positions when the fluid pressure on opposite sides of said wall means is unbalanced to overcome said bias, said wall means being exposed on one side to a control chamber and on the other side to said first portion of said passageway, said wall means having a restricted conduit connecting its opposite sides, means adapted to be connected to a source of fluid pressure connected to said first portion of said passageway to produce a first fluid pressure in said first portion, and control means shiftable between a first condition to connect said control chamber to a source of second fluid pressure different from said first pressure to unbalance said wall means to overcome said bias and a second condition to close said chamber so that said valve will be biased to said one position.

2. A fluid flow control device as recited in claim 1 wherein said first fluid pressure is sub-atmospheric and said second fluid pressure is atmospheric.

3. A fluid flow control device as recited in claim 1 wherein said first fluid pressure is superatmospheric and said second fluid pressure is atmospheric.

4. A fluid flow control device as recited in claim 1 wherein said wall means is connected to said valve means through force multiplying lever means.

5. A fluid flow control device as recited in claim 1 wherein said biasing means is operated by fluid pressure.

6. A fluid flow control device as recited in claim 1 wherein said biasing means is operated by fluid pressure in said first portion of said passageway.

7. A fluid flow control device as recited in claim 1 wherein said biasing means comprises a second fluid pressure responsive wall means connected to said valve and mounted in said valve body, said second wall means being subjected on one side to the fluid pressure in said first portion and on the other side to said second fluid pressure.

8. A fluid flow control device as recited in claim 1 wherein filters are mounted on both sides of said wall means through which filters fluid approaching said wall means from either direction must pass.

References Cited in the file of this patent

UNITED STATES PATENTS

| | | |
|---|---|---|
| 2,240,163 | Pick | Apr. 29, 1941 |
| 2,320,886 | Quiroz | June 1, 1943 |
| 2,388,868 | Ray | Nov. 13, 1945 |
| 2,582,626 | Escher | Jan. 15, 1952 |
| 2,896,664 | Lieser | July 28, 1959 |
| 2,896,665 | Lieser | July 28, 1959 |
| 2,907,347 | Parks | Oct. 6, 1959 |
| 2,936,780 | Pratt | May 17, 1960 |
| 2,941,546 | Cowherd | June 21, 1960 |
| 2,970,611 | Hoge | Feb. 7, 1961 |
| 3,064,627 | Blanton | Nov. 20, 1962 |
| 3,122,065 | Laun | Feb. 25, 1964 |